(No Model.)

T. BERRIDGE.
SHEARS.

No. 474,284. Patented May 3, 1892.

Witnesses:
William McLoughlin
John C. Murry

Inventor.
Thomas Berridge
By W. T. Fitzgerald & Co.
Attorneys

UNITED STATES PATENT OFFICE.

THOMAS BERRIDGE, OF STURGIS, MICHIGAN.

SHEARS.

SPECIFICATION forming part of Letters Patent No. 474,284, dated May 3, 1892.

Application filed March 4, 1891. Serial No. 383,791. (No model.)

*To all whom it may concern:*

Be it known that I, THOMAS BERRIDGE, a citizen of the United States, residing at Sturgis, in the county of St. Joseph and State of Michigan, have invented certain new and useful Improvements in Shears, of which the following is a specification, reference being had therein to the accompanying drawings.

My invention has relation to improvements in scissors or shears; and it consists in the peculiar construction, certain novel combinations, and the adaptation of parts hereinafter described, and particularly pointed out in the claim appended.

Figure 1:
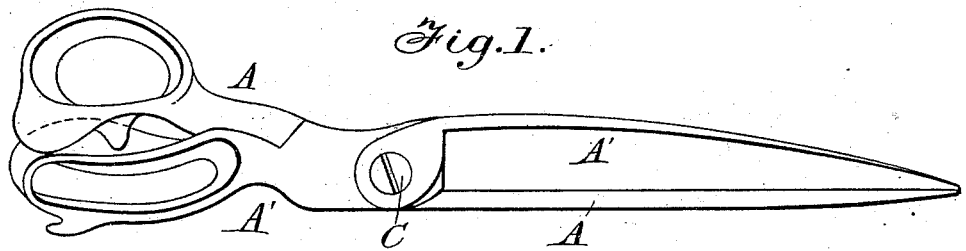
Figure 2:
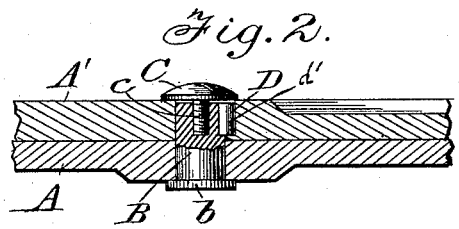
Figure 3:
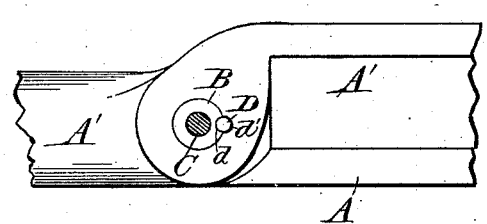

In the accompanying drawings, Figure 1 is a perspective view of a pair of scissors embodying my invention. Fig. 2 is an enlarged detail longitudinal section with parts in elevation, and Fig. 3 is a similar view taken in a plane at right angles to Fig. 2.

Referring to the said drawings by letter, A indicates one member of a pair of scissors or shears, and A' indicates the other member of the same, both of which members may in general be of the ordinary or any approved form. Both of the members A A', as better illustrated in Fig. 2 of the drawings, are provided at corresponding points in their length with circular transverse apertures designed to receive a pivot-bolt B, which is provided at one end with a flange-head b, which rests upon the outside of the member A and serves, in conjunction with a removable head upon the other end of the bolt, to prevent lateral play and displacement thereof.

Formed in the wall of the circular transverse aperture of the member A' and extending from the outside of said member a suitable distance inwardly, is a transversely-disposed groove d', which serves, in conjunction with a similar groove d formed in the periphery of the bolt B, to receive and seat a key or feather D, which serves to fix the member A' to the bolt B, whereby the friction caused by manipulating the members is limited to the circular portion of said bolt and the transverse aperture of the member A.

The bolt B, as illustrated in Fig. 2, is provided at one end with a central longitudinal threaded bore, which is designed to receive the threaded shank c of the removable head C. This head C is preferably of a circular form and is of such a diameter that it will cover the grooves d d' in the bolt and the member A' and serve to hold the feather D in position and prevent play thereof. The key or feather D above described also serves in practice to prevent the bolt B from turning when the head C is turned to adjust the members with respect to each other for cutting or to disconnect the members.

By connecting the two members of a pair of scissors or shears in the manner described it will be readily seen that the same may be very easily manipulated and that they will cut freely and evenly.

Having thus described my invention, what I claim, and desire to secure by Letters Patent, is—

In a pair of scissors or shears, the combination, with the member A, having a circular transverse aperture, and the member A', having a similar aperture at a corresponding point and a transversely-disposed groove formed in the wall of said aperture, of the pivot-bolt taking loosely through the aperture in the member A and having a flange-head at one end and a central longitudinal threaded bore at its opposite end, a transversely-disposed groove formed in the periphery of the bolt, a feather seated in the aligned grooves of the member A' and the bolt, and the removable head-covering, the aligned grooves of the member and bolt, and the feather, and having a threaded shank seated in the bore of the pivot-bolt, substantially as and for the purpose set forth.

THOMAS BERRIDGE.

Witnesses:
WILLIAM MCLOUGHLIN,
H. L. ANTHONY.